United States Patent [19]

Coon et al.

[11] 4,391,336

[45] Jul. 5, 1983

[54] ACOUSTIC SYSTEM TO GUIDE A COAL SEAM AUGER

[75] Inventors: Julian B. Coon, Ponca City, Okla.; James C. Fowler, Burke, Va.; Charles E. Payton, Houston, Tex.; Kenneth H. Waters, Cape Town, South Africa

[73] Assignee: Conoco Inc., Ponca City, Okla.

[21] Appl. No.: 301,993

[22] PCT Filed: Nov. 24, 1980

[86] PCT No.: PCT/US80/01565
§ 371 Date: Aug. 21, 1981
§ 102(e) Date: Aug. 21, 1981

[87] PCT Pub. No.: WO82/01908
PCT Pub. Date: Jun. 10, 1982

[51] Int. Cl.[3] .......................................... E21B 47/09
[52] U.S. Cl. .................................. 175/45; 181/104; 299/1
[58] Field of Search ................ 299/1, 30; 175/1, 45, 175/61; 181/104, 105, 108

[56] References Cited

U.S. PATENT DOCUMENTS

| | | | |
|---|---|---|---|
| 3,578,807 | 5/1971 | Barrett | 299/1 |
| 3,853,185 | 12/1974 | Dahl et al. | 175/45 |
| 3,907,045 | 9/1975 | Dahl et al. | 175/45 |
| 4,184,562 | 1/1980 | Bakamjian | 181/108 X |

FOREIGN PATENT DOCUMENTS 443973   9/1974   U.S.S.R. ............................. 299/1

Primary Examiner—Ernest R. Purser
Attorney, Agent, or Firm—William J. Miller

[57] ABSTRACT

A method for boring a hole so that its axis is substantially parallel to the axis of a previously bored hole for positioning an acoustical transmitter and receiver against the hole of the hole being bored so that their position on the wall lies on a horizontal plane through the axis of the bore hole being bored. Then transmitting an acoustical frequency acoustical signal into the wall of the hole. The reflected signal is then received from the adjacent wall along with other unwanted additional reflections. The phase shift is then determined between the transmitted and received signal and the changes in the distance between the wall of the bore hole is then determined.

4 Claims, 3 Drawing Figures

ACOUSTIC SYSTEM TO GUIDE A COAL SEAM AUGER

DISCUSSION OF PRIOR ART

Several patents discuss the problems related with the boring of a hole parallel to a previously bored hole. U.S. Pat. No. 3,907,045 is one such patent which discusses an apparatus for boring an elongated bore hole with a drilling apparatus which contains a flux sensitive coil and directional drill apparatus. An antenna is inserted through a previously drilled bore hole and is connected between the ground and a sectional generating apparatus. Flux generated by the antenna will be picked up by the flux sensitive coil. Readout apparatus is connected to the coil and an indication of the magnitude of the flux being cut by the coil is determined. A control system coupled to the horizontal drill is then actuated to maintain the horizontal drill along a predetermined path which is substantially parallel to the bore hole previously drilled.

U.S. Pat. No. 3,853,185 discloses a drilling apparatus, likewise, used for forming a horizontal bore hole substantially parallel to a first-drilled horizontal bore hole. The previously drilled bore hole has a signal generating apparatus inserted into it. A horizontal drill is inserted into the subterranean stratum adjacent the first-drilled bore hole and operated until it is in the formation. The signal receiver contained in the horizontal drill apparatus will then receive a signal generated by the signal generating apparatus. The signal generating apparatus will always be maintained a fixed distance behind or in front of the horizontal drilling apparatus. The signal receiver in the horizontal drill will include an antenna sensitive to direction which can orient itself with the signal generating apparatus. Knowing the angle between the horizontal drill and the signal generating apparatus along with the distance along the first bore hole between the first bore hole and the signal generating apparatus will provide sufficient data to calculate the distance between the first horizontal bore hole and the drilling apparatus.

An application depending concurrent with this application, Ser. No. 104,627, filed Dec. 17, 1979, by Julian B. Coon and Bobby Thomas entitled "Coal Auger Guidance System" discloses another method for drilling two bore holes parallel to each other. The application, however, deals specifically with the drilling of auger holes which is also the subject matter of this specification. In the invention disclosed in the application an apparatus is described for drilling a bore hole parallel to a previously drilled bore hole and constructing a cart which has a rearward and forward steerable wheel with a detector mount attached to the cart. The detector mount will move the detector perpendicular to the axis of the bore hole and adjacent the wall of the bore hole. The detector includes apparatus for precisely orienting the detector a fixed distance from the wall to maintain a constant coupling which can be repeated each time the detector is moved. Apparatus is also provided in the cart to keep the detector mounting platform always parallel to a plan which passes along the gravitation of the bore hole wall.

Equipment outside the bore hole can determine the position of the cart and the detector for determining the distance between the bore hole. A seismic signal is positioned in the other bore hole to create a signal which can be received by the detection.

BRIEF DESCRIPTION OF THE INVENTION

This invention, like the former invention is a method for boring a second hole substantially parallel with another hole previously drilled. Unlike the previous concept this concept permits a more reliable determination of the variation distance between the bore hole and permits these readings to be taken without the addition of equipment into the formerly driven bore hole. The measuring equipment will be carried by the drilling apparatus and can be used during the quiet periods while additional augers are being added or removed to take the readings. The apparatus for performing the method essentially comprises a three-foot section of auger which contains a transmitter at the end nearest the bore or cutting head and a receiver at the opposite end. A signal is transmitted into the stratum by the transmitter and received at the receiver. As an acoustical signal of frequency f is introduced into the coal seam, it will experience a phase shift as a result of traversing a distance between the hole being drilled and a hole parallel to the hole being drilled. Knowledge of the phase shift is equivalent to knowledge of the time required for the acoustic wave to progress through the distance between the bore holes at a velocity v. The phase shift measurement can be taken at a single frequency or can be repeated at several different frequencies which would allow additional determinations of the change in separation distance and would provide the information necessary to determine the absolute separation between the bore holes.

DETAILED DESCRIPTION OF THE INVENTION

Figure 1:
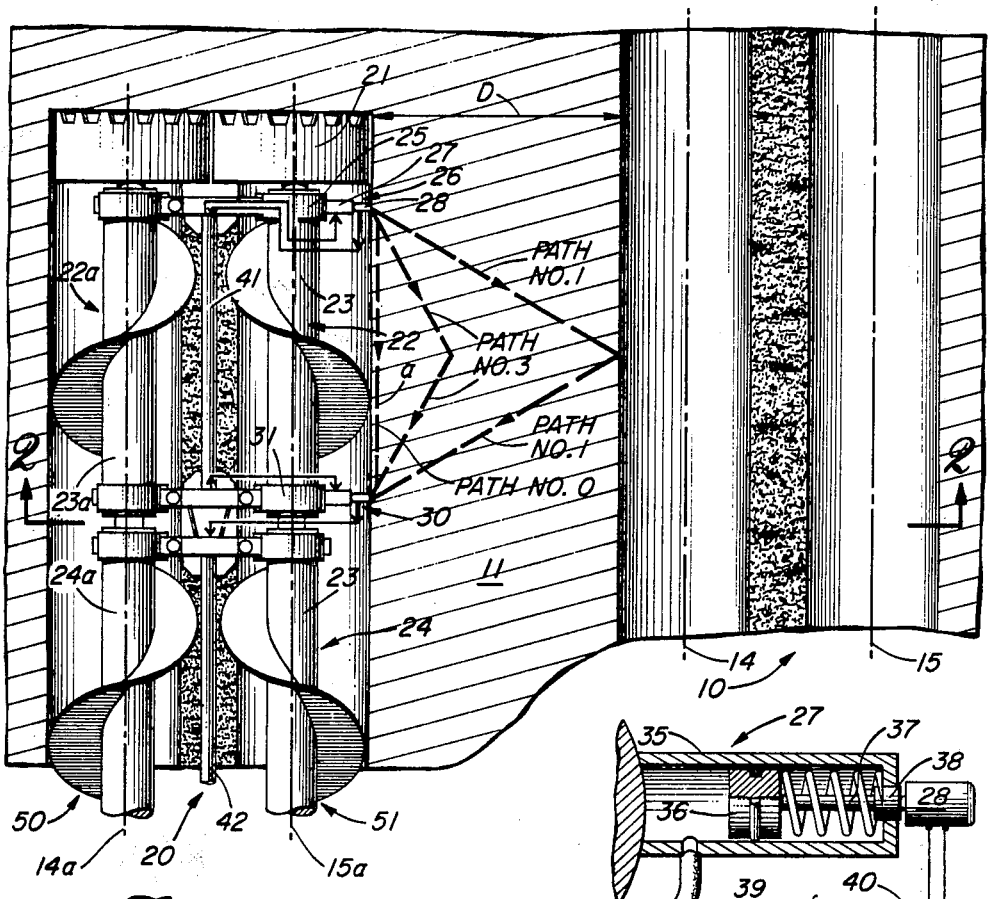
FIG. 1 is a top view taken through lines 1—1 of FIG. 2 and illustrates the method for carrying out this invention along with apparatus necessary to carry out the method.
Figure 3:
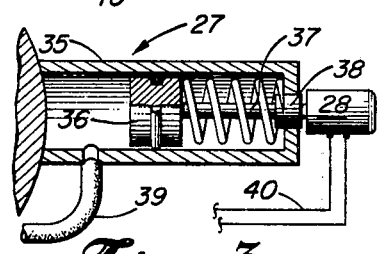
FIG. 3 is a small sectional drawing of one of the transducers used to carry out this invention.
Figure 2:
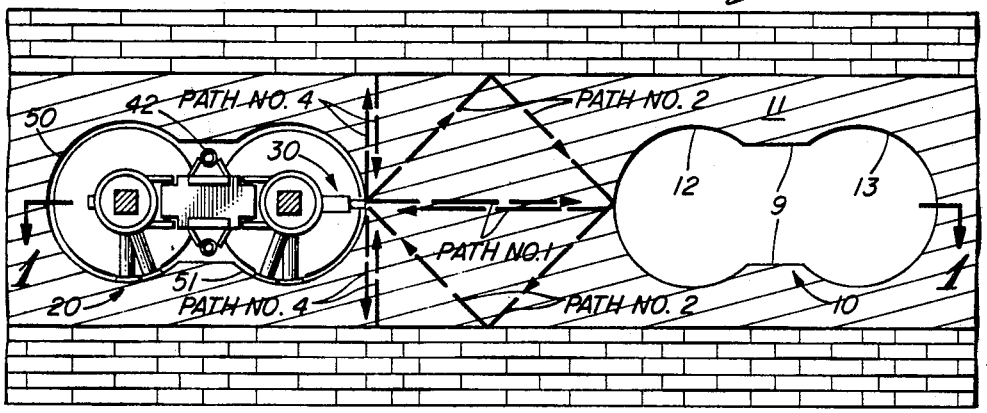
FIG. 2 is an end view taken through FIGS. 2—2 of FIG. 1 showing additional wire paths taken by the signal as it is introduced into the coal seam.

Referring to all of the figures but in particular to FIGS. 1 and 2 a bore hole 10 which has previously been drilled into coal seam 11 is illustrated and comprises two nearly circular cuts 12 and 13 with the center portion 9 removed. Either bore hole 12 or 13 has an axis 14 or 15. When drilling the second hole as designated by arrow 20 an auger boring apparatus is utilized and essentially comprises a boring head 21, an auger 22 coupled to shaft 23 to boring head 21 and additional augers 24, likewise coupled to shafts 23 to the next succeeding auger 22. Additional augers 24 are coupled together in series after one auger has penetrated approximately twelve feet. Thus every twelve feet the augering must cease while an additional auger is added to the string. Augers may function as a single string or as a double string in which case additional augers 22a, 24a, etc., will be paired and tied together with apparatus in a manner to make them operate as a unitary pair. Such apparatus is clearly disclosed in U.S. Pat. No. 4,015,674 issued Apr. 5, 1977, to Hawthorne and Hazen and entitled "Apparatus for Unitizing a Pair of Augers." In this apparatus for carrying out the method it should be noted that auger 22 will be shorter than the standard augers 24 or 24a. In this instance auger 22 is approximately three feet in length; however, the distance is not critical so long as the distance is known. At the hub 25 of auger 22 is provided a transducer generally referred to by arrow 26 and comprises a hydraulic cylinder 27 and the transducer 28. Transducer 28 along with its positioning cylinder 27 is clearly described when reference is made to FIG. 3. A second transducer generally referred to by the arrow 30 is mounted on the rearward hub or bearing 31. Referring to FIG. 3 a detailed cross-sectional view of the transducer assembly 26 and 30 is illustrated and comprises a cylinder 35 having a piston 36 axially mounted inside. A shaft 37 is coupled through a seal and bearing 38 to a transistor 28. A hydraulic or air inlet pressure pipe 39 is connected to the internal portion of cylinder 35 and when pressured will urge piston 36 outward, causing transducer 28 to be in engagement with the coal seam 11. Wires 40 couple the output of transistor 28 (or transducer 30) to an external reading source. Wires 40 and pipe 39 can be conveyed through the center portion 41 (see FIG. 1) and 42 and so on through each preceding auger pair to an external source for applying the pressure as needed and receiving and transmitting the desired signals. Such a center wire channel is clearly described in U.S. Pat. No. 4,021,076 issued May 3, 1977, to Hawthorne and Hazen entitled "Wire Communications Channel for a Pair of Unitized Augers."

OPERATION

The basic apparatus operates by rotating shafts 23 and 23a causing the boring head 21 to cut into coal seam 11, forming holes 12 and 13 in the case of the hole which has been already bored and holes 50 and 51 in the case of the holes being bored in the coal seam 11. As the cutting head or boring head 21 rotates, coal is dislodged and moved backward toward the beginning of the cut. Coal is continually moved backward by the flights which are around the shafts 23 and 23a. As the total length of the auger has entered into the coal seam, a new section must be added. As a new section is added there is a certain period of time when the boring heads 21 are not rotating. This is generally referred to as "quiet time." During the quiet time measurements can be taken without the added noise from the cutting of coal by the boring head. During this period of time pressure through pipe 39 enters cylinder 35 and causes piston 36 to urge transducer 28 against the coal seam 11. Likewise, transistor 30 is edged against coal seam 11. When this occurs a signal is generated in transducer 28 and received by transducer 30. Thus an acoustic signal of a selected frequency f is introduced into the coal seam by transducer 28. As it passes through the coal system a distance d and it returns to transducer 30, the signal will experience a phase shift. Knowledge of the phase shift is equivalent to the time required for the acoustic wave to progress through the distance d at a velocity v. It should be noted that acoustic waves are reflected whenever the wave encounters a region of changing acoustical impedance. Acoustical impedance is defined by a product of the mass density of the medium and the velocity of sound in the medium. The acoustical impedance contrasts between coal, for example, and an air-filled void such as the previous mined hole is very large and will cause almost all of the incident acoustical energy to be reflected. Reflection techniques which have been tried in the past have been found totally unsuitable since the frequencies which are needed to obtain the necessary precision of the time measurements are excessively high and such excessively high frequencies will not propagate well through a coal seam with the fractures, cleats, and other inhomogeneous inclusions. Such is clearly illustrated by the following example.

EXAMPLE

If it were possible to initiate a sonic pulse travelling only along path No. 1 in FIG. 1, the total transit time, t, would be related to the separation distance, d, by $$t = \frac{2l_1}{v} = \frac{2(d^2 + a^2/4)^{\frac{1}{2}}}{v}$$

or $$d = \frac{(v^2t^2 - a^2)^{\frac{1}{2}}}{2}$$

where a is the source receiver separation distance and v is the velocity of sound in coal, and $l_1 = \frac{1}{2}$ path 1. In order to estimate the precision of the time measurements assume typical values of a=3 feet, d=3 feet, v=8,000 ft/sec, which gives t≈0.84 msec. In order to detect a change in d or size Δd, then a shift in t of size Δt must be detectable. Assume that Δd=1 inch. Then $$\Delta t = 2\frac{\left[(d + \Delta d)^2 + \frac{a^2}{4}\right]^{\frac{1}{2}}}{v} - 2\frac{\left[d^2 + \frac{a^2}{4}\right]^{\frac{1}{2}}}{v} \approx 18.7 \ \mu sec$$

In order to detect a time shift of 18.7 μsec, frequencies on the order of F≈(1/Δt)∼54 KHz are required. Propagation of acoustic energy at these high frequencies through a medium such as a coal seam with fractures, cleats, and other inhomogeneities is difficult. Further complications are caused by the necessity of distinguishing the reflected pulse corresponding to path No. 1 from the other paths of acoustic propagation. Thus the 'pulse' reflection method is rejected as unsuitable for this application. In accordance with the teachings of this invention, however, if the phase shift is utilized as the criterion for determining variation in distance then lower frequencies (in the 500 to 5,000 Hertz range) can be used which should propagate well through the coal seam. If a monochromatic acoustic wave or frequency f were transmitted into the coal seam, then due to the round trip travel time t, a phase shift between the initial wave and the wave reflected along with No. 1 will be produced. The value of the phase shift, $\phi_1$, for a frequency of f=2,000 hz, d=3 feet, a=3 feet, and v=8,000 ft/sec is $$\phi_1 = \left(\frac{2\pi f}{v}\right) 2l_1 = \left(\frac{2\pi f}{v}\right)^2 \left(d^2 + \frac{a^2}{4}\right)^{\frac{1}{2}} =$$

3.35π radians = 604°

In order to detect a change Δd=1 inch, a phase shift of Δφ must be measured, where $$\Delta\phi = \left(\frac{2\pi f}{v}\right)^2 \left[(d + \Delta d)^2 + \frac{a^2}{4}\right]^{\frac{1}{2}} - \phi = 13°$$

Phase measurements of this magnitude can be performed using standard techniques.

A complication of the previously simplified problem is introduced because the acoustic signal detected at the receiver is the sum of the signals along each of the paths represented in FIG. 1. However, the paths which produce a strong reflected signal depend upon d except for paths 0 and 4. The phase shift due to path 0 should not change since a is fixed. Thus, one should be able to calibrate the total phase shift observed for the reflected signal as a function of d.

CONCLUSIONS

Thus it should be a fairly simple matter to keep the axis 15a, for example, parallel to the axis 14 by measuring the phase difference between the transmitted signal and the received signal along path 1. It is obvious, of course, that in order to cause the auger boring heads 21 to maintain a parallel axis between 15a and 14, some form of guidance must be used. This can be accomplished by hydraulic pressure being applied to the augers 22a and 22 which hydraulic pressure feet are well known in the art and will not be described in this application. Also differential pressure applied to shaft along center lines 14a and 15a will cause a variation in the drilling rate and as a consequence a turn in the axis of 15a with respect to 14.

Other methods of controlling an auger system are well known and could be used as well as the method as described above. In the particular embodiment described, the acoustic transmitter and receiver were illustrated as being in contact with the coal seam. Other apparatus can be incorporated and will function just as well. Such apparatus as that described in application Ser. No. 104,627 previously described, for example, will function quite well.

It is obvious that changes can be made in the application and still be within the spirit and scope of the invention as disclosed in the specification and appended claims.

What is claimed is:

1. Method for boring a hole so that its axis is substantially parallel to the axis of a previously bored hole comprising:
    (a) positioning an acoustical transmitter and receiver in acoustical communication with the wall of the hole being bored so that their position on the said wall lies on a plane through the axis of said hole being bored and the axis of the previously bored hole;
    (b) transmitting a continuous frequency acoustic signal into the wall of said hole;
    (c) receiving the reflected signal from the adjacent wall along with other unwanted acoustical reflections;
    (d) determining the phase shift between said transmitted signal and said first received signal; and
    (e) determining the changes in the distance between the wall of said bored hole and said hole being bored.

2. Method as described in claim 1 where said signal being transmitted and said signal being received is accomplished during the time the boring apparatus is being extended.

3. Method as described in claims 1 or 2 where said frequency (f) is between 500 and 5000 hz.

4. Method as described in claims 1 or 2 where said continuous frequency acoustical signal comprises a plurality of selected frequencies, whereby the absolute distance between said hole can be determined.

* * * * *